April 21, 1953 L. L. LAKATOS 2,636,086

TUNING INDICATOR FOR FREQUENCY SHIFT SIGNALS

Filed Dec. 26, 1951 2 SHEETS—SHEET 1

INVENTOR
Louis L. Lakatos
BY
Charles H. Brown
ATTORNEY

TUNING INDICATOR FOR FREQUENCY SHIFT SIGNALS

Filed Dec. 26, 1951 2 SHEETS—SHEET 2

INVENTOR
Louis L. Lakatos
BY Charles H. Brown
ATTORNEY

Patented Apr. 21, 1953

2,636,086

UNITED STATES PATENT OFFICE 2,636,086

TUNING INDICATOR FOR FREQUENCY SHIFT SIGNALS

Louis L. Lakatos, Philadelphia, Pa., assignor to Radio Corporation of America, a corporation of Delaware Application December 26, 1951, Serial No. 263,265

14 Claims. (Cl. 178—69)

This invention relates to a tuning indicator for frequency shift telegraph signals, and more particularly to a cathode ray tube circuit for indicating the condition of tuning of a frequency shift telegraph receiver.

An object of this invention is to provide a simple cathode ray tube monitoring circuit for frequency shift telegraph receivers, in which no calibration or calibration adjustments are required.

Another object is to devise a novel null indicating device for indicating the tuning of frequency shift telegraph receivers, which device has zero output when the receiver is properly tuned.

A further object is to devise an indicating device for frequency shift telegraph receivers, in which no balancing of the mark and space inputs to the indicator is necessary.

A still further object is to provide a novel type of coupling circuit for coupling the mark and space signals to a cathode ray tube tuning indicator for a frequency shift telegraph receiver, in which the indication produced on the cathode ray tube screen may be centered with respect to the tube face when the receiver is properly tuned, without affecting the accuracy of the indication and without requiring any compensation by way of calibration.

Yet another object is to devise a novel amplifying circuit for coupling a balanced or double-ended input circuit to an unbalanced or single-ended output circuit, while at the same time providing an amplifier input of high impedance such as to not unduly load a preceding stage.

An additional object is to devise a monitoring circuit for frequency shift receivers which indicates the degree of noise and interference present in the receiving channel.

In frequency shift telegraph transmission, two discrete frequencies are used, one for mark and the other for space. The signal, when keyed by the normal telegraph waveform of substantially rectangular shape, alternates between these two frequencies in accordance with the keying. In the usual receiver, the signal is amplified, converted to intermediate frequency which is amplified, limited and supplied to a frequency discriminator, which produces a keyed direct current in which the polarity reverses in accordance with the keying characters. This keyed direct current is used to operate tone keyers or automatic recording apparatus. The usual difference between the two frequencies is of the order of 850 cycles or less in the communication bands between two and thirty megacycles for which reason narrow band receivers can be used for improved signal-to-noise ratio. This places stringent requirements on the accuracy of receiver tuning, since the signal supplied to the discriminator (and which is derived from the receiver) should be centered on the discriminator characteristic for proper operation. Stated in other words, the mean between the mark and space frequencies supplied to the discriminator should be equal to the center frequency of the discriminator, so that the direct currents of opposite polarities out of the discriminator have the same absolute magnitude. In view of these stringent tuning requirements, it is quite desirable to have available a continuous indication of the condition of tuning, and according to this invention such an indication is provided.

In accordance with the invention, frequency shifted mark-space telegraph signals from a receiver are applied to the input of a discriminator. The output from the discriminator is applied in parallel to two diodes connected back-to-back and the other electrode of each of these diodes is connected to a respective one of the vertical deflecting plates of a cathode ray tube. This results in the production of a pair of dots on the cathode ray tube screen if the receiver feeding the discriminator is not tuned to the center of the discriminator characteristic. A portion of the output of a tone keyer is applied to the horizontal deflecting plates in order to sweep out one of the dots, thus providing an indication of the sense of detuning. Alternatively, a modified sweep arrangement is caused to sweep a certain one of the dots to the right and the other to the left, to indicate the sense of detuning. An A. C.-coupled amplifier may be used between the diodes and the vertical deflecting plates if amplification is required.

The foregoing and other objects of the invention will be best understood from the following description of some exemplifications thereof, reference being had to the accompanying drawings, wherein:

Fig. 1 is a schematic representation of one embodiment of the invention;

Figs. 2*a*–2*e* are various waveforms and patterns illustrating the mode of operation of the embodiment of Fig. 1;

Figures 3, 5A, 5B:
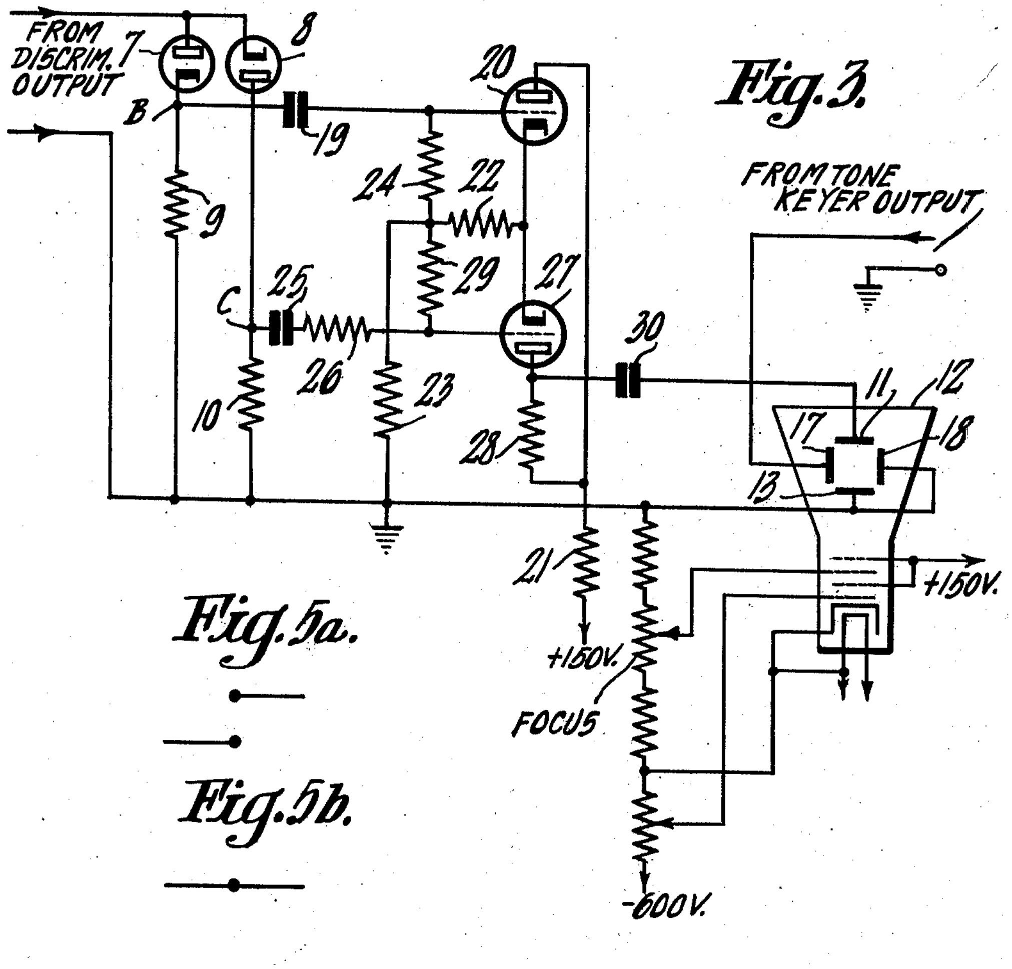
Fig. 3 is a diagrammatic representation of a modification of Fig. 1.
Figure 4:
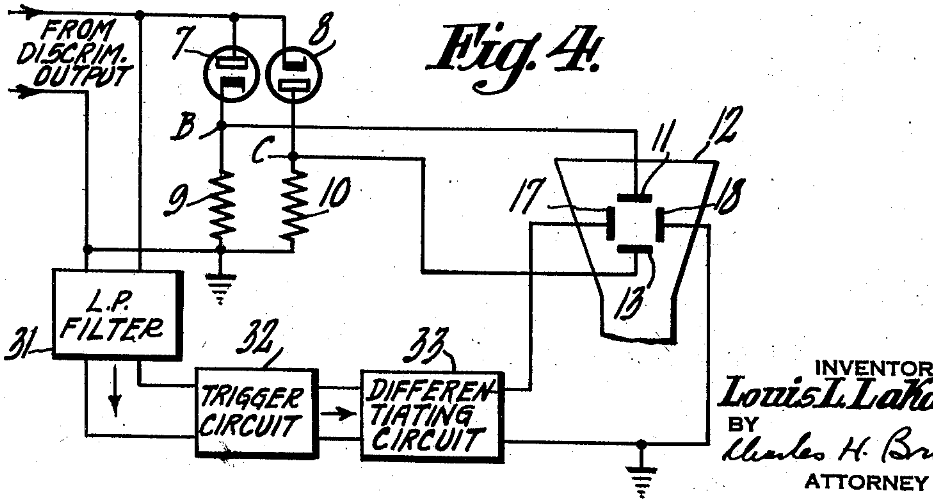
Fig. 4 is a schematic representation of a modification of Fig. 1.

Figs. 5*a* and 5*b* are trace patterns illustrating the operation of the Fig. 4 circuit.

Figure 1:
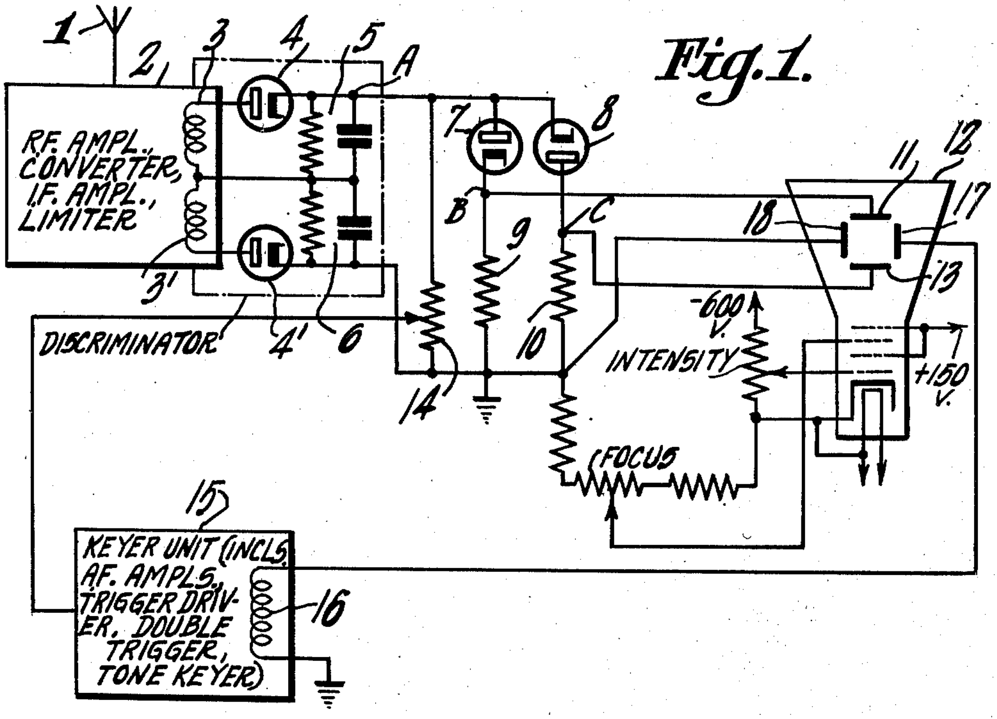

Referring to Fig. 1, the transmitted frequency shift telegraph signal of radio frequency is received by antenna 1 and applied to unit 2, wherein it is amplified, converted to intermediate frequency, again amplified, and limited to substantially eliminate amplitude variations. The output of the limiter in receiving unit 2 is applied to the two transformer secondaries 3 and 3' which may, for example, be coupled to respective differently-tuned transformer primaries. The windings 3 and 3' are differentially coupled to detectors 4 and 4' which comprise two diode structures either in separate envelopes or in a common envelope. The diode structures have their cathodes coupled together differentially by load impedance-and-condenser units 5 and 6 to constitute a discriminator wherein potentials are produced representing mark interval when the received signal is at mark frequency and representing space interval when the received signal is at space frequency. In the embodiment being described, the potential at the cathode of diode 4 varies from positive to negative direct current symmetrically about zero or ground potential when the receiver is properly tuned to the center of the discriminator characteristic, the cathode of diode 4' being grounded. Positive discriminator output may correspond to received mark frequency and negative output to space frequency, or vice versa, depending upon the connections. When the receiver is improperly tuned the positive and negative potential variations at the cathode of diode 4 are unequal, as will appear more clearly hereinafter. The discriminator utilized may, for example, be similar to the discriminator-detector described in Schock et al. Patent #2,515,668, dated July 18, 1950.

The direct current output (keyed) of the discriminator described is supplied to two diode structures 7 and 8 connected back-to-back and the associated respective load resistors 9 and 10. More particularly, the output of the discriminator appears between point A (connected to the cathode of diode 4) and ground (the cathode of diode 4'). The anode of diode 7 is connected to point A and resistor 9 is connected between the cathode of this diode and ground, while the cathode of diode 8 is connected to point A and resistor 10 is connected between the anode of this diode and ground. Diodes 7 and 8 are preferably two separate diode structures in a common envelope. Due to the above connections, diode 7 conducts when A is positive with respect to ground and diode 8 conducts when A is negative with respect to ground. The cathode of diode 7 (point B) is connected to one vertical deflecting plate 11 of a cathode ray oscilloscope tube 12, while the anode of diode 8 (point C) is connected to the other (opposite) vertical deflecting plate 13 of tube 12.

The various electrodes of cathode ray tube 12 are energized by suitable potentials as illustrated, producing an electron beam which is projected toward the face or screen of the tube. This electron beam is subject to deflection in the vertical direction in response to voltages applied between deflecting plates 11 and 13.

When a keyed frequency shifted telegraph signal is being received, point A is alternatively positive or negative with respect to ground, depending on the keying, due to the action of the discriminator. If the signal input frequency to the discriminator is centered on the discriminator characteristic, the positive and negative excursions are equal, while if said signal input frequency is detuned from such center frequency, the positive excursion becomes larger than the negative, or vice versa, depending on the sense or direction of detuning.

On the positive excursions of point A, diode 7 conducts and point B is positive with respect to ground, while diode 8 is non-conducting and therefore point C is at substantially ground potential and would be at ground potential except for the contact potential of this diode. Consequently, upper deflecting plate 11 is positive with respect to lower deflecting plate 13 and the electron beam in tube 12 is deflected upward by an amount proportional to the potential difference between the two plates, which in turn is proportional to the amplitude of the positive excursions of the keyed wave out of the discriminator.

On the negative excursions of point A, diode 8 conducts and point C is negative with respect to ground, while diode 7 is non-conducting and therefore point B is at substantially ground potential and would be at ground potential except for the contact potential of this diode. As a result, lower plate 13 is negative with respect to upper plate 11 and the electron beam in tube 12 is again deflected upward by an amount proportional to the potential difference between the two plates, which in turn is proportional to the amplitude of the negative excursions of the keyed wave out of the discriminator.

Thus, when the positive and negative excursions of the discriminator output wave are equal, the same upward deflection of the electron beam is produced by both the positive and negative swings, while if the two excursions of such output wave are unequal the two upward deflections of the electron beam are different.

Figure 2A:
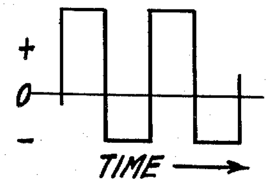

Fig. 2*a* represents the keyed direct current output of the discriminator for a detuned or off-tuned condition of the receiver, the sense of detuning in this particular case being such as to cause the positive excursions to exceed the negative ones. Fig. 2*b* illustrates the potentials with respect to ground of points B and C for this same off-tuned condition. Fig. 2*c* shows the deflection of the electron beam as a function of time, for this same off-tuned condition. The displacement between the vertical deflections for the two discriminator output polarities (denoted by X in Fig. 2*c*) is a measure of the amount of receiver detuning, but not the sense.

Of course, if the receiver tuning were proper (in other words, if there were no detuning) the positive and negative excursions in Fig. 2*a* would be equal in amplitude, in Fig. 2*b* the positive maximum voltage of point B would be equal in absolute value to the negative maximum voltage of point C, while in Fig. 2*c* the deflection of the electron beam would be represented by a straight horizontal line, indicating equal deflections for both positive and negative voltage excursions of the discriminator output.

Figure 2D:
Figure 2E:
Figure 2B:
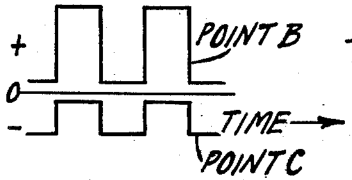
Figure 2C:
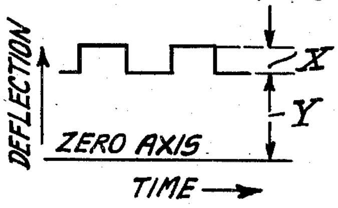

In the absence of horizontal deflection of the electron beam, the trace on the cathode ray tube screen, for the detuned condition of Figs. 2*a*–2*c*, would be as illustrated in Fig. 2*d*, consisting of two bright dots with a faint vertical line connecting them. When the trace pattern consists of two bright dots, rather than only one (as a result of unequal vertical deflections for the two discriminator output polarities), the operator knows a detuned condition exists and also knows the amount of the detuning, but not its sense. If the tuning were proper (that is, no detuning of the receiver) the two dots would coincide to produce in effect only a single dot.

One method of obtaining an indication of the sene of detuning is to use the keyed tone output of a keyer unit for horizontal deflection of the electron beam, as illustrated in Fig. 1. A potentiometric resistor 14 is connected across the output of the discriminator and a portion of the voltage across such resistor is fed to a keyer unit 15. This keyer unit may include the following circuits in succession: one or more audio frequency amplifiers, a trigger driver, a double or two-stage trigger, and finally a tone keyer. The arrangement of the trigger driver and double trigger may, for example, be like that disclosed in the aforementioned Schock et al. patent. The tone keyer is controlled by the final stage of the two-stage trigger and functions to provide keyed (on-off) tone output, providing tone output on one of the polarities of the discriminator output (corresponding to either mark or space) and no output or zero output on the other. The keyed tone output appears across a transformer secondary winding 16 and is applied between the horizontal deflecting plates 17 and 18 of cathode ray tube 12. One end of winding 16 is grounded, as is one deflecting plate 18, while the other end of winding 16 is connected directly to deflecting plate 17.

The tone output produced by the tone keyer is of course alternating current, and appears across deflecting plates 17 and 18 simultaneously with the appearance at plates 11 and 13 of either one discriminator-derived deflecting voltage or the other, but not both. Consequently, one or the other of the dots in Fig. 2*d* is swept out to a horizontal line, producing the trace pattern illustrated in Fig. 2*e*. In this way, by knowing beforehand the relation between the tone keyer output and the positive and negative excursions of the discriminator output (corresponding to mark and space signals), the sense of detuning may be determined from the pattern of Fig. 2*e*, since only the particular dot representing a certain polarity is swept out. In other words, the polarities represented by the two dots in Fig. 2*d* are identified, and the sense of detuning is indicated. The transitions between mark and space are represented by the slanting lines in Fig. 2*e*, these slanting lines being in random positions in the absence of synchronism between the keying frequency and the horizontal deflection frequency (the frequency of the tone).

Usually, the setup is such that mark signal is represented by a lower frequency input to the discriminator than is space signal, and the tone keyer operates to produce a tone output for mark signal and no tone for space signal. Thus, the dot representing mark signal is swept out to produce a line.

If the receiver is detuned in a direction opposite to that illustrated in Fig. 2*a* the negative excursions would exceed in amplitude the positive excursions, in Fig. 2*b* the negative maximum of point C would exceed in absolute value the positive maximum of point B and in Fig. 2*c* the deflection curve would be reversed or flipped over. In Fig. 2*e* the dot would be below the horizontal line, rather than above as shown.

In Fig. 2*e*, as the receiver tuning is changed in the proper direction the dot and the horizontal line trace approach each other and when the tuning is correct the dot and the line trace coincide. Thus, on a "centered signal" both points B and C vary (in voltage) up and down together and there is no net vertical deflection of the cathode ray or electron beam.

Noise or interference appearing at the discriminator output is visible as random vertical deflections (commonly termed "hash") on one or both dots in Fig. 2*d*, or in Fig. 2*e* on the dot and/or the line trace. In this manner, a continuous automatic indication of the degree of noise and interference present in the receiving channel is provided.

The character of the keying transitions is made evident from the appearance of the slant line traces in Fig. 2*e*.

In the manner above described, a continuous indication is provided of the condition of receiver tuning, with respect to the discriminator characteristic. It will be noted that the indicator of this invention is a null indicator, with zero output (zero net deflection, or coincidence of line trace and dot in Fig. 2*e*) at resonance or at proper tuning, and unequal deflections off resonance or when the receiver is detuned. No balancing, calibration, or adjustments are required.

In a practical case, amplification is usually required between points B and C and the vertical plates of tube 12. This could be A. C.-coupled in order to remove the D. C. component, represented by the distance $$Y+\frac{X}{2}$$

in Fig. 2*c*. When the D. C. component is removed in this way and when no fluctuating signal is applied to the deflecting plates of the cathode ray tube, there will be no deflection of the electron beam, meaning that the spot-trace centers itself, up and down, on the screen of the tube. A practical circuit with A. C.-coupled amplification, which was built and successfully tested, is illustrated in Fig. 3.

In Fig. 3, the diode-resistor combinations 7, 9 and 8, 10 are connected across the output of the discriminator (between a varying-potential lead and ground) in exactly the same manner as in Fig. 1. From point B (cathode of diode 7) a coupling extends through a coupling capacitor 19 to the grid of a triode structure 20 the anode of which has no load resistor but is connected through a resistor 21 of low value to the positive terminal of a source of unidirectional potential. The cathode of triode 20 is connected through two series-connected resistors 22 and 23 to ground, while the grid side of capacitor 19 is connected through a resistor 24 to the junction of resistors 22 and 23. From point C (anode of diode 8) a coupling extends through a coupling capacitor 25 and a resistor 26 to the grid of a triode structure 27 the anode of which is connected through a load resistor 28 to the junction of the anode of triode 20 and resistor 21. The cathode of triode 27 is connected to the cathode of triode 20, so that these two cathodes utilize the same resistors 22 and 23 in common. The grid side of resistor 26 is connected through a resistor 29 to the junction of resistors 22 and 23. The resistors 26 and 29 consistute a voltage divider whereby only a portion of the voltage at point C is applied to the grid of triode 27. This voltage dividing network provides compensation for the contact potential of the two diodes 7 and 8 connected back-to-back, thus making the voltages at B and C (as they affect the deflecting plates 11 and 13) more nearly approach zero when the respective diodes are not conducting.

The inputs of the triodes 20 and 27 are balanced push-push, as may be seen from Fig. 2*b*. When point C is changing from its most negative excursion to zero, that is, upwards (becoming more positive), point B is changing from substantially zero to its most positive excursion, that is, also upwards or more positive. In other words, the top of the negative square wave of point C, corresponding substantially to the zero axis or its most positive position (when diode 8 is not conducting), occurs at the same time that diode 7 is conducting and point B is most positive. The average D. C. potentials of the two points are of course of opposite polarity, point C being negative and point B being positive. Output is taken from across load resistor 28 by means of a coupling capacitor 30 one side of which is connected to the anode of diode 27 and the other side of which is connected to one vertical deflecting plate 11, the other deflecting plate 13 being grounded. Thus, the output of triodes 20 and 27 is unbalanced or single-ended. Amplifying triodes 20 and 27 thus constitute a balanced-input, unbalanced-output amplifier between diodes 7 and 8 and cathode ray tube 12.

The triode 20 provides a high impedance output circuit for diode 7, thus not unduly loading said diode. The triode 27 is an amplifier which is grid-driven by diode 8, thus presenting a high impedance output circuit for such diode. Triode 20 operates as a cathode follower stage which is grid-driven by diode 7 and which in turn drives the cathode of triode 27, from the anode of which output is taken by way of load resistor 28 and capacitor 30. The cathode follower stage 20 drives the cathode of triode 27 by means of the common cathode resistors 22 and 23, to which the cathodes of both these triodes are connected. The cathode of triode 27 cannot be driven directly from diode 7, because if it were the loading effect on such diode would be too great due to the low impedance output circuit presented to the diode by the cathode circuit of the triode; hence, the cathode follower stage 20 is utilized, with the high input impedance, low output impedance which is characteristic of cathode follower stages.

The reason for using a voltage divider network 26, 29 in the grid input circuit of triode 27, and for not using one in the grid input circuit of triode 20, should now be apparent. It is desirable to equalize the driving voltages fed to the grid and to the cathode of triode 27. There is a certain signal loss in the cathode follower stage 20, so that there would be a similar loss in the signal fed to the cathode of triode 27. To balance this loss, the signal fed to the grid of triode 27 is reduced by the voltage dividing network 26, 29 and since the cathode follower stage 20 is already unavoidably "lossy," the full signal voltage is applied to its grid.

The output of amplifying stage 27 is fed to one vertical deflecting plate 11 of the cathode ray tube 12 through capacitor 30. The other vertical deflecting plate 13 of tube 12 is grounded. As in Fig. 1, the output of a tone keyer is applied between the horizontal deflecting plates 17 and 18, plate 18 being grounded.

In operation, the voltage on the discriminator output lead connected to the anode of diode 7 and to the cathode of diode 8 becomes alternatively positive and negative with respect to ground in accordance with the keying, as in Fig. 1. When this lead is positive, point B is positive and point C is at ground potential. The positive-going potential at B is applied to the grid of triode 20 and produces a positive voltage at its cathode which is applied to the cathode of triode 27. This produces the same effect as a negative voltage applied to the grid of this triode, so that the plate current in triode 27 is reduced, giving a positive voltage at its anode which is applied to deflecting plate 11 to deflect the electron beam upward, deflecting plate 13 being connected to ground. When the ungrounded discriminator lead is negative, point C is negative and point B is at ground potential. The negative-going potential at C is applied to the grid of triode 27 and reduces the plate current in this tube. Thus, a positive voltage again appears at the anode of triode 27 which again deflects the electron beam in tube 12 upward, through the application of this positive voltage to deflecting plate 11. Since the tone keyer output is used for horizontal sweep in Fig. 3 also, the pattern produced on the cathode ray tube screen by the Fig. 3 circuit is exactly similar to that previously described in connection with Fig. 1, the pattern for a particular direction of receiver mistuning being represented in Fig. 2e.

Due to the fact that capacitors 19, 25 and 30 are used in the Fig. 3 circuit, the amplifier is A. C.-coupled, removing the D. C. component represented by the distance $$Y+\frac{X}{2}$$

in Fig. 2c. The spot-trace on the screen of the cathode ray tube thus centers itself, up and down, when no fluctuating signal is applied to the deflecting plates of the tube.

In an embodiment according to Fig. 3 which was built and successfully tested, the following component values were used. It is to be understood that these values are given merely by way of illustration and not by way of limitation.

| | | |
|---|---|---|
| Tube 7 | | ½ 6AL5 |
| Tube 8 | | ½ 6AL5 |
| Tube 12 | | 2BP1 |
| Tube 20 | | ½ 12AX7 |
| Tube 27 | | ½ 12AX7 |
| Resistor 9 | ohms | 560,000 |
| Resistor 10 | do | 560,000 |
| Resistor 21 | do | 10,000 |
| Resistor 22 | do | 1,000 |
| Resistor 23 | do | 39,000 |
| Resistor 24 | megohms | 1.2 |
| Resistor 26 | ohms | 510,000 |
| Resistor 28 | do | 470,000 |
| Resistor 29 | do | 680,000 |
| Capacitor 19 | mfd | 0.1 |
| Capacitor 25 | mfd | 0.1 |
| Capacitor 30 | mfd | 0.1 |

It should be understood that the balanced-to-unbalanced amplifier of Fig. 3 will operate equally well when the two input voltages thereto are either in-phase or out-of-phase. If they are in-phase (push-push, as described) the net output, for equal inputs, is zero, as previously described, while if they are out-of-phase (push-pull) the two currents due to the grid drive and to the cathode drive of tube 27 would add in this tube.

It will be recalled that in Figs. 1 and 3, the output of a tone keyer is applied to the horizontal deflecting plates, to provide an indication of the sense of detuning or mistuning of the receiver. Other methods for providing sense indication are possible, and one such method is illustrated in Fig. 4. In Fig. 4, the diodes 7 and 8 and load resistors 9 and 10 are coupled to the discriminator output in exactly the same manner as in Fig. 1, point B (cathode of diode 7) being connected to vertical deflecting plate 11 and point C (anode of diode 8) being connected to vertical deflecting plate 13. A portion of the discriminator output, which consists of a keyed direct current square wave extending above and below the zero axis of potential, as illustrated in Fig. 2*a*, is applied to a low pass filter 31, which passes the keying frequency. The output of filter 31 is applied to a trigger circuit 32, which may be a two-stage trigger circuit quite similar to the double-trigger keyer control circuit disclosed in Schock et al. Patent #2,515,668, dated July 18, 1950. The output of trigger circuit 32 is applied to a differentiating circuit 33, which may be an ordinary RC-type differentiating circuit.

The filter 31 functions somewhat as an integrating circuit and attenuates high frequency components, so that if the output of this filter were fed directly to the differentiating circuit, this latter circuit would not have a steep wavefront applied to it; in this case the output of circuit 33 would be low, and lacking in the high frequency components required for a narrow pulse. The function of trigger circuit 32 is to restore the steep wavefront of the square wave applied to the input of filter 31, at the output of circuit 32. The differentiation of this steep wavefront square wave by circuit 33 results in narrow pulses at its output.

The narrow-pulse output of circuit 33 is applied between horizontal deflecting plates 17 and 18 of cathode ray tube 12, to provide a sweep voltage. Differentiating circuit 32 operates to differentiate the voltage applied to its input, as previously described. Thus, the upward-going portion of the square wave illustrated in Fig. 2*a* results in the production of a positive pulse between the high side of the output of circuit 33 and ground, which positive pulse is applied to horizontal deflecting plate 17 (horizontal deflecting plate 18 being grounded); similarly, the downward-going portion of the Fig. 2*a* square wave results in a negative pulse being applied between plate 17 and ground. When horizontal deflecting plate 17 is positive with respect to plate 18 (ground) the deflection of the electron beam will be to the left, while when plate 17 is negative with respect to plate 18 the deflection of the electron beam will be to the right.

The square wave applied to circuit 32, and differentiated thereby, is delayed a few milliseconds, with respect to the square wave variations of points B and C applied to the vertical deflecting plates 11 and 13, because of the low pass filter 31. This allows the vertical deflections of the beam corresponding to the two respective portions of the discriminator output wave (represented by the two dots of Fig. 2*d*, for a certain condition of receiver detuning) to be effected before the spots are swept out horizontally. Since the positive and negative voltage output pulses are produced by circuit 32 in response to the mark-space transitions of the square wave discriminator output, a few milliseconds after such transitions, and since a positive voltage output pulse corresponds to the marking signal and a negative voltage output pulse to the spacing signal, or vice versa, the mark dot of Fig. 2*d* is traced out to the right and the space dot to the left, or vice versa, depending upon the connections, in substantial synchronism with the vertical deflection. Thus, for one particular sense of receiver detuning the trace pattern on the screen of tube 12 will be somewhat as illustrated in Fig. 5*a*, which shows one dot swept out to the left and the other to the right, of a central position. If the receiver is detuned in the opposite direction or opposite sense, the pattern of Fig. 5*a* will be reversed, that is, the dot swept out to the right will be below, rather than above, the dot swept out to the left. Since for any particular setup the mark dot is swept out in one particular direction and the space dot in the other direction, the sense of detuning of the receiver will be indicated.

If the tuning of the receiver is proper, the trace pattern produced will be about as illustrated in Fig. 5*b*, with the two dots coinciding (as explained above in connection with Fig. 2*d*) and one being swept out to the left and the other to the right. This provides a line trace with a dot in the center thereof, see Fig. 5*b*.

What is claimed is:

1. A tuning indicator for a frequency shift telegraph receiver comprising in combination, frequency discriminator means for deriving from the received frequency shifted signals a keyed direct current wave of substantially square waveform having a peak of one polarity with respect to a fixed reference potential for mark frequency and having a peak of the opposite polarity for space frequency, the relative magnitudes of said two peaks representing the condition of tuning of said recevier, a cathode ray tube having means for producing an electron beam and means for deflecting said beam, and means for applying said wave to said deflecting means to produce two separate deflections of said beam, one corresponding to the amplitude of one peak of said wave and the other corresponding to the amplitude of the other peak of said wave.

2. An indicator in accordance with claim 1, including additional deflecting means operatively coupled to the tube for causing the two produced deflections to have different visual aspects.

3. An indicator in accordance with claim 1, wherein the two deflections produced are both in the same direction with respect to a reference point on the fluorescent screen of the tube, said indicator including additional deflecting means operatively coupled to the tube for causing the two produced deflections to have different visual aspects.

4. A tuning indicator for a frequency shift telegraph receiver comprising in combination, means for deriving from the received frequency shifted signals a keyed direct current wave of substantially square waveform having a peak of one polarity with respect to a fixed reference potential for mark frequency and having a peak of the opposite polarity for space frequency, means feeding said wave to a pair of parallel circuits each consisting of a unilaterally-conducting device and an output impedance in series, the devices in said two circuits being oppositely disposed, a cathode ray tube having means for producing an electron beam and means for deflecting said beam, and means for applying the voltages developed across each of said impedances to said deflecting means to produce two separate deflections of said beam each one of which corresponds to the amplitude of a respective one of said developed voltages.

5. An indicator in accordance with claim 5, including additional deflecting means operatively coupled to the tube for causing the two produced deflections to have different visual aspects.

6. An indicator in accordance with claim 4, wherein the two deflections produced are both in the same direction with respect to a reference point on the fluorescent screen of the tube, said indicator including additional deflecting means operatively coupled to the tube for causing the two produced deflections to have different visual aspects.

7. A tuning indicator for a frequency shift telegraph receiver comprising in combination, means for deriving from the received frequency shifted signals a keyed direct current wave of substantially square waveform having a peak of one polarity with respect to a fixed reference potential for mark frequency and having a peak of the opposite polarity for space frequency, a tone keyer receptive of said wave for producing on-off keyed tone keyed in accordance with said wave, a cathode ray tube having means for producing an electron beam and two separate means for deflecting said beam in different directions, means for applying the output of said tone keyer to one of said deflecting means, and means for applying said wave to the other of said deflecting means to produce two separate deflections of said beam, one corresponding to the amplitude of one peak of said wave and the other corresponding to the amplitude of the other peak of said wave.

8. A tuning indicator for a frequency shift telegraph receiver comprising in combination, means for deriving from the received frequency shifted signals a keyed direct current wave of substantially square waveform having a peak of one polarity with respect to a fixed reference potential for mark frequency and having a peak of the opposite polarity for space frequency, means for differentiating said wave to produce pulses of opposite polarities corresponding to successive transition points of said wave, a cathode ray tube having means for producing an electron beam and two separate means for deflecting said beam in different directions, means for applying the output of said differentiating means to one of said deflecting means, and means for applying said wave to the other of said deflecting means to produce two separate deflections of said beam, one corresponding to the amplitude of one peak of said wave and the other corresponding to the amplitude of the other peak of said wave.

9. A tuning indicator for a frequency shift telegraph receiver comprising in combination, means for deriving from the frequency shifted signals a keyed direct current wave of substantially square waveform having a peak of one polarity with respect to a fixed reference potential for mark frequency and having a peak of the opposite polarity for space frequency, means feeding said wave to a pair of parallel circuits each consisting of a unilaterally-conducting device and an output impedance in series, the devices in said two circuits being oppositely disposed, a tone keyer receptive of said wave for producing an on-off keyed tone keyed in accordance with said wave, a cathode ray tube having means for producing an electron beam and two separate means for deflecting said beam in different directions, means for applying the output of said tone keyer to one of said deflecting means, and means for applying the voltages developed across each of said impedances to the other of said deflecting means to produce two separate deflections of said beam each one of which corresponds to the amplitude of a respective one of said developed voltages.

10. A tuning indicator for a frequency shift telegraph receiver comprising in combination, means for deriving from the received frequency shifted signals a keyed direct current wave of substantially square waveform having a peak of one polarity with respect to a fixed reference potential for mark frequency and having a peak of the opposite polarity for space frequency, means feeding said wave to a pair of parallel circuits each consisting of a unilaterally-conducting device and an output impedance in series, the devices in said two circuits being oppositely disposed, means for differentiating said wave to produce pulses of opposite polarities corresponding to successive transition points of said wave, a cathode ray tube having means for producing an electron beam and two separate means for deflecting said beam in different directions, means for applying the output of said differentiating means to one of said deflecting means, and means for applying the voltages developed across each of said impedances to the other of said deflecting means to produce two separate deflections of said beam each one of which corresponds to the amplitude of a respective one of said developed voltages.

11. A tuning indicator for a frequency shift telegraph receiver comprising in combination, means for deriving from the received frequency shifted signals a keyed direct current wave of substantially square waveform having a peak of one polarity with respect to a fixed reference potential for mark frequency and having a peak of the opposite polarity for space frequency, a cathode ray tube having means for producing an electron beam and means for deflecting said beam, and means for applying said wave to said deflecting means to produce two separate deflections of said beam, one corresponding to the amplitude of one peak of said wave and the other corresponding to the amplitude of the other peak of said wave; said means for applying including a first electron flow control device having electron-emitting, electron-receiving and control electrodes, a second electron flow control device also having electron-emitting, electron-receiving and control electrodes, means for supplying input voltages of like phase, derived from said wave, to the control electrodes of the respective devices, means connecting the two electron-emitting electrodes together and to a common impedance, and an output circuit including said deflecting means connected to the electron-receiving electrode of said second device.

12. A tuning indicator for a frequency shift telegraph receiver comprising in combination, means for deriving from the received frequency shifted signals a keyed direct current wave of substantially square waveform having a peak of one polarity with respect to a fixed reference potential for mark frequency and having a peak of the opposite polarity for space frequency, means feeding said wave to a pair of parallel circuits each consisting of a unilaterally-conducting device and an output impedance in series, the devices in said two circuits being oppositely disposed, a cathode ray tube having means for producing an electron beam and means for deflecting said beam, and means for applying the voltages developed across each of said impedances to said deflecting means to produce two separate deflections of said beam each one of which corresponds to the amplitude of a respective one of said developed voltages; said means for applying including a first electron flow control device having electron-emitting, electron-receiving and control electrodes, a second electron flow control device also having electron-emitting, electron-receiving and control electrodes, means for supplying input voltages of like phase, derived from across said impedances, to the control electrodes of the respective devices, means connecting the two electron-emitting electrodes together and to a common impedance, and an output circuit including said deflecting means connected to the electron-receiving electrode of said second device.

13. A tuning indicator for a frequency shift telegraph receiver comprising in combination, means for deriving from the received frequency shifted signals a keyed direct current wave of substantially square waveform having a peak of one polarity with respect to a fixed reference potential for mark frequency and having a peak of the opposite polarity for space frequency, means feeding said wave to a pair of parallel circuits each consisting of a unilaterally-conducting device and an output impedance in series, the devices in said two circuits being oppositely disposed, a cathode ray tube having means for producing an electron beam and means for deflecting said beam, and means for applying the voltages developed across each of said impedances to said deflecting means to produce two separate deflections of said beam each one of which corresponds to the amplitude of a respective one of said developed voltages; said means for applying including a first triode electron discharge device having anode, cathode and control electrodes, a second triode electron discharge device having anode, cathode and control electrodes, means for supplying input voltages of like phase, derived from across said impedances, to the control electrodes of the respective devices, means connecting the first device as a cathode follower stage driving the second device, and an output circuit including said deflecting means connected to the anode electrode of said second device.

14. A tuning indicator for a frequency shift telegraph receiver comprising in combination, means for deriving from the received frequency shifted signals a keyed direct current wave of substantially square waveform having a peak of one polarity with respect to a fixed reference potential for mark frequency and having a peak of the opposite polarity for space frequency, means feeding said wave to a pair of parallel circuits each consisting of a unilaterally-conducting device and an output impedance in series, the devices in said two circuits being oppositely disposed, a tone keyer receptive of said wave for producing on-off keyed tone keyed in accordance with said wave, a cathode ray tube having means for producing an electron beam and two separate means for deflecting said beam in different directions, means for applying the output of said tone keyer to one of said deflecting means, and means for applying the voltages developed across each of said impedances to the other of said deflecting means to produce two separate deflections of said beam each one of which corresponds to the amplitude of a respective one of said developed voltages; said means for applying including a first triode electron discharge device having anode, cathode and control electrodes, a second triode electron discharge device having anode, cathode and control electrodes, means for supplying input voltages of like phase, derived from across said impedances, to the control electrodes of the respective devices, means connecting the first device as a cathode follower stage driving the second device, and an output circuit including said other deflecting means connected to the anode electrode of said second device.

LOUIS L. LAKATOS.

References Cited in the file of this patent

UNITED STATES PATENTS

| Number | Name | Date |
|---|---|---|
| 2,154,379 | Estes | Apr. 11, 1939 |
| 2,178,074 | Jakel et al. | Oct. 31, 1939 |
| 2,553,674 | Purington | May 22, 1951 |
| 2,613,271 | Trevor | Oct. 7, 1952 |